US007276293B1

(12) United States Patent
Saruwatari et al.

(10) Patent No.: US 7,276,293 B1
(45) Date of Patent: Oct. 2, 2007

(54) FAR-INFRARED RADIATOR AND METHOD FOR PRODUCING METHOD

(75) Inventors: Koichi Saruwatari, Tokyo (JP); Maejima Masatsugu, Tokyo (JP); Hirata Masanori, Tokyo (JP); Ito Hiroshi, Tokyo (JP); Teramoto Keigo, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/276,413

(22) PCT Filed: May 24, 2000

(86) PCT No.: PCT/JP00/03305

§ 371 (c)(1), (2), (4) Date: Aug. 8, 2003

(87) PCT Pub. No.: WO01/90447

PCT Pub. Date: Nov. 29, 2001

(51) Int. Cl.
*B32B 15/04* (2006.01)
*C25D 11/20* (2006.01)

(52) U.S. Cl. .................. 428/469; 428/472; 428/472.2; 205/105; 205/173

(58) Field of Classification Search ..................... None
See application file for complete search history.

(56) References Cited

U.S. PATENT DOCUMENTS 3,616,297 A * 10/1971 Cooke et al. ............... 205/101
3,664,932 A * 5/1972 Patrie .......................... 205/50
3,704,209 A * 11/1972 Patrie .......................... 205/50
4,147,598 A * 4/1979 Shigeta et al. .............. 205/105
5,336,341 A 8/1994 Maejima et al. ............ 148/415
6,228,241 B1 * 5/2001 Alwitt et al. ................. 205/50

FOREIGN PATENT DOCUMENTS

| | | | |
|---|---|---|---|
| JP | 73032064 | * | 5/1969 |
| JP | 61 113792 A1 | | 5/1986 |
| JP | 63-145797 | | 6/1988 |
| JP | 04-110493 | | 4/1992 |
| JP | 06-088292 | | 3/1994 |

OTHER PUBLICATIONS

Patent Abstracts of Japan, vol. 010 No. 296, Oct. 8, 1986 & JP 61 113792 A (Yoshifumi Tominaga), May 1986, Abstract.

* cited by examiner

*Primary Examiner*—Jennifer McNeil
*Assistant Examiner*—Timothy M. Speer
(74) *Attorney, Agent, or Firm*—Darby & Darby

(57) ABSTRACT

The present invention discloses a far infrared radiator used in various types of heating equipment. This far infrared radiator is comprised of a base material 1 composed of aluminum or aluminum alloy, and an electrolytic colored film 2 formed on this base material 1. Fine irregularities are formed in the surface of the electrolytic colored film, and nickel or cobalt is heterogeneously deposited from the bottoms to the openings in micropores of this film 2.

Electrolytic colored film 2 is obtained by performing electrolysis treatment in a nickel bath or cobalt bath using an alumite film 3, formed on the surface of base material 1 having fine irregularities, as the cathode.

4 Claims, 2 Drawing Sheets

FAR-INFRARED RADIATOR AND METHOD FOR PRODUCING METHOD

CROSS-REFERENCE TO RELATED APPLICATIONS

This application is a U.S. national phase application under 35 U.S.C. §371 based upon (and claiming priority from) co-pending International Application No. PCT/JP00/03305 filed May 24, 2000 and published in Japanese on Nov. 29, 2001, the entire disclosure of which is incorporated herein by reference.

TECHNICAL FIELD

The present invention relates to a far infrared radiator used for heating, drying and so forth that allows the obtaining of high emissivity and superior heat resistance by heterogeneously depositing nickel (Ni) or cobalt (Co) in the micropores of an alumite film by electrolytic treatment.

BACKGROUND ART

Far infrared radiators convert thermal energy into far infrared rays having a wavelength of 2-30 μm as a result of heating. These far infrared rays are radiated to the outside, enabling them to be used in a wide range of applications including heaters, dryers, curing devices and heat sinks.

One type of such a far infrared radiator is disclosed in, for example, Japanese Unexamined Patent Application, First Publication No. 63-145797. In this far infrared radiator, an anodic oxidization film having a thickness of 10 μm or less is formed on aluminum or aluminum alloy, and an oxide of a metal such as iron (Fe), chromium (Cr), nickel (Ni) or cobalt (Co) is precipitated on the surface and in the micropores of this anodic oxidation film by electrolytic treatment.

However, in this far infrared radiator, the spectral emissivity in the wavelength region of 7 μm or less required for heating and drying is only 40-50%, thus making its performance as a far infrared radiator inadequate.

In addition, although an example of another far infrared radiator consists of dyeing an aluminum anodic oxidation film with black dye, this far infrared radiator has the shortcoming of inferior heat resistance of 200° C. or less.

Moreover, that comprising anodic oxidation treatment of an aluminum alloy having an alloy component such as manganese (Mn) or silicon (Si) to form a black anodic oxidation film is described as a far infrared radiator in Japanese Examined Patent Application, Second Publication 7-116639 and U.S. Pat. No. 5,336,341.

In this example of the prior art, however, since the aluminum alloy has a special composition, it is subject to restrictions on its shape, thereby resulting in the disadvantage of being unable to obtain a far infrared radiator of any desired shape.

Thus, the object of the present invention is to provide a far infrared radiator that is free of any of the shortcomings of the far infrared radiators of the prior art, has high emissivity, ample heat resistance and can be formed into any desired shape.

In addition, another object of the present invention is to provide a production method of a far infrared radiator that has high emissivity, ample heat resistance and can be formed into any desired shape.

DISCLOSURE OF THE INVENTION

The far infrared radiator of the present invention has a base material comprised of aluminum or aluminum alloy and an electrolytic colored film formed on this base material, the electrolytic colored film having nickel or cobalt heterogeneously precipitated and deposited from the bottoms to the openings of micropores of an alumite film formed on the base material, with fine irregularities being formed in the surface of the electrolytic colored film.

In addition, in the production method of a far infrared radiator of the present invention, after forming fine irregularities in the surface of the above base material, an alumite film is formed by performing anodic oxidation treatment followed by performing electrolysis in a nickel salt bath or cobalt salt bath using this alumite film as the cathode, and heterogeneously precipitating and depositing nickel or cobalt from the bottoms to the openings of micropores in the alumite film.

BEST MODE FOR CARRYING OUT THE INVENTION

The following provides a detailed explanation of the present invention with reference to the attached drawings.

Figure 1:
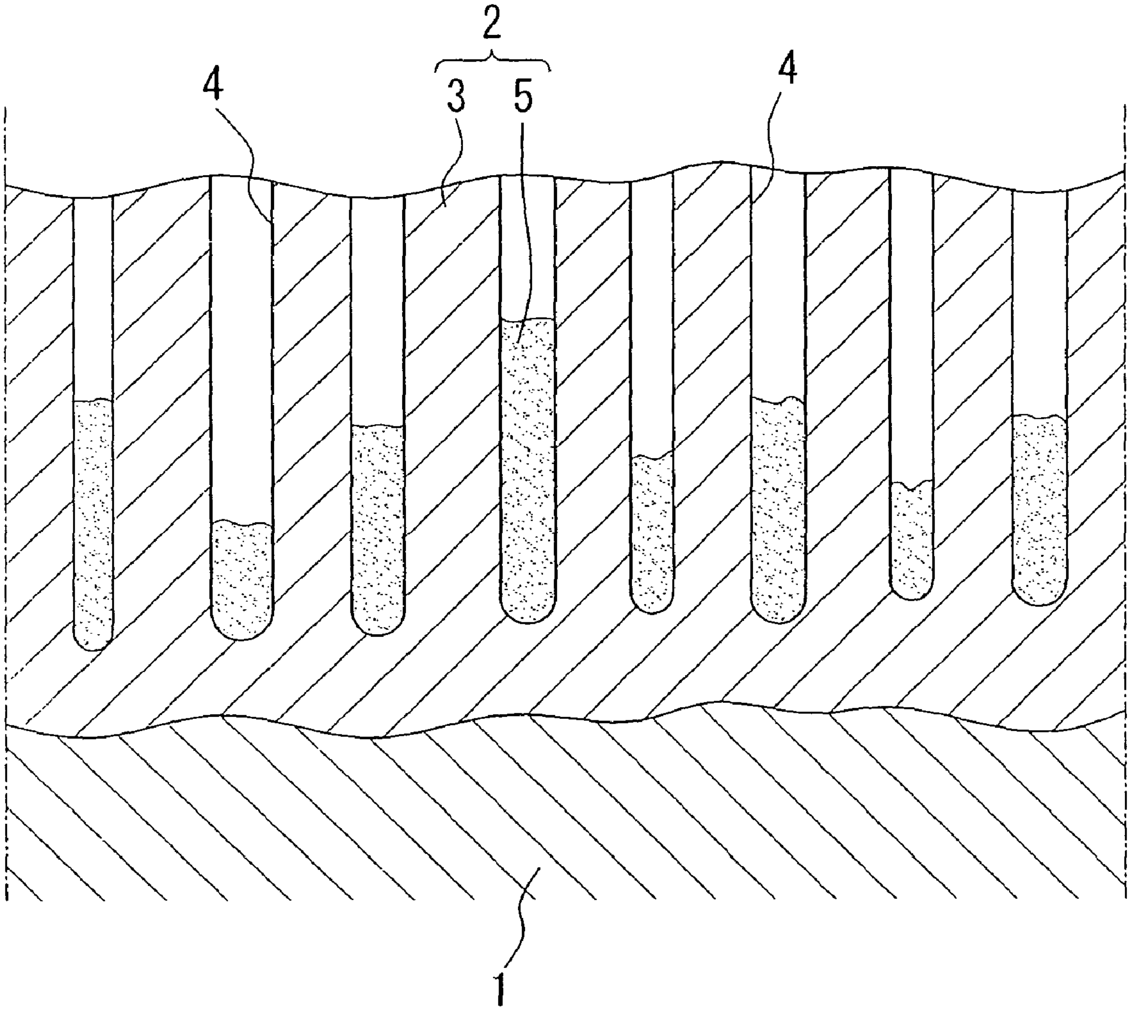
FIG. 1 is a cross-sectional view schematically showing one example of the essential portion of a far infrared radiator of the present invention.

FIG. 1 is a cross-sectional view schematically showing one example of a far infrared radiator of the present invention. Reference symbol 1 in the drawing indicates a base material.

This base material 1 may be a compound material in which a thin film of aluminum or aluminum alloy having a thickness of 50 μm or more is joined by cladding, plating or other means to a base comprised of aluminum, aluminum alloy or other metal material such as iron, steel or copper alloy, and it may have any desired shape such as in the form of a sheet, wire, rod or pipe.

An electrolytic colored film 2 is formed on the surface of base material 1 integrated into a single unit with base material 1.

In this electrolytic colored film 2, nickel or cobalt 5 is precipitated and deposited by electrolytic treatment from the bottoms to the openings of micropores 4 of alumite film 3. This electrolytic colored film 2 is blackish-brown to black and has a thickness of 15 μm or more, preferably 15-100 μm, and more preferably 15-50 μm. Adequate far infrared emissivity is unable to be obtained if its thickness is less than 15 μm.

As shown in the drawing, the deposited thickness of the nickel or cobalt deposited in micropores 4 is not uniform over the entire alumite film 3, but rather exhibits comparatively large variation. This heterogeneity is important in terms of obtaining high emissivity.

The deposited thickness of nickel or cobalt 5 has a minimum value of 2 μm, maximum value of 30 μm, and is preferably 20 μm, exhibiting a fluctuation width of about 15-fold. In addition, the mean value over the entire film 3 is equivalent to 2-60% of the depth of the micropores. If this deposited thickness is less than 2 μm, adequate emissivity is unable to be obtained, and even if it exceeds 30 μm, there is no significant improvement of emissivity.

In addition, the surface of electrolytic colored film 2 contains fine irregularities. The surface roughness in terms of the 10-point mean roughness (Rz) according to the JIS method is 1-30 μm. If this value is less than 1 μm, adequate emissivity is unable to be obtained, and even if this value exceeds 30 μm, no improvement of emissivity can be expected.

The interface of electrolytic colored film 2 and base material 1 also contains fine irregularities corresponding to the fine irregularities in the surface of this electrolytic colored film 2. The presence of these fine irregularities at the interface of this electrolytic colored film 2 and base material 1 causes micropores 4 of alumite film 3 to have a complex structure, thereby preventing the deposition status of nickel or cobalt precipitated at that location from being constant, and giving rise to variations in its deposited thickness. In addition, this complexity of the structure of micropores 4 and the heterogeneity of the deposition status of nickel or cobalt serve to disperse the internal stress in electrolytic colored film 2, thereby inhibiting the formation of cracks caused by thermal expansion and contributing to improved heat resistance. In addition, as shown in the drawing, although a type of peaks occurs in the deposited thickness due to the heterogeneous deposition of nickel or cobalt, the interval between these peaks is 2-20 μm, and preferably 5-10 μm. If this interval is less than 2 μm, adequate emissivity is unable to be obtained, and even if this interval exceeds 20 μm, no improvement of emissivity can be expected.

Moreover, the majority of the chemical species of the nickel or cobalt deposited in micropores 4 is in the form of the metal, while only a slight amount, namely about 1 wt % or less, is in the form of oxide, sulfide and so forth.

In addition, the integral emissivity in the wavelength region of 4-15 μm of this far infrared radiator is 75% or more. Emissivity is expressed as a ratio based on the amount of far infrared rays emitted from a black body at the same temperature being 100%, while integral emissivity is determined by dividing the integral value of the amount emitted in a certain wavelength region by the similar integral value of a black body.

A value for this integral emissivity of 75% or more indicates a superior far infrared radiator.

Moreover, the heat resistance of this electrolytic colored film 2 is 400° C. or higher. Here, heat resistance is defined as the highest temperature at which both discoloration and cracking do not occur in electrolytic colored film 2 when the far infrared radiator is heated gradually.

Production of this type of far infrared radiator is performed in the manner described below.

To begin with, fine irregularities are formed in the surface of base material 1 comprised of aluminum or aluminum alloy. Mechanical methods such as blasting, rolling, use of a sander belt and buffing, or chemical methods such as acid etching, alkaline etching, electrolytic etching and ion replacement, can be used for the method of forming these irregularities.

Surface roughness is made to be such that the 10-point mean roughness (Rz) according to the JIS method is 1-30 μm by forming these fine irregularities in the surface.

As a result of this surface roughening, the substantially effective surface area of the alumite film formed later is increased, the direction of growth of micropores in the alumite film is randomized resulting in a complex structure, and the amount of precipitated and deposited nickel or cobalt deposited here increases resulting in improved emissivity and improved heat resistance.

Continuing, the surface of this base material 1 is subjected to anodic oxidation treatment to form alumite film 3. Although there are no particular restrictions on the method of this anodic oxidation treatment, it is preferable that micropores be formed having a shape that facilitates precipitation of nickel or cobalt in the next step. For example, this is performed using a direct current, alternating current, combination direct and alternating current or superimposed alternating and direct current for the current waveform in an electrolysis bath of inorganic acid such as sulfuric acid or oxalic acid, organic acid or a mixed acid of the two. The electrolysis temperature is 5-25° C., and preferably 15-20° C.

In the case of using a sulfuric acid bath, the concentration of sulfuric acid is set at 150-250 g/liter, and preferably 180-210 g/liter, and in the case of mixed acid bath also containing oxalic acid, the concentration of oxalic acid is 0.5-3 wt %, and preferably 1-2 wt %.

For the conditions of electrolysis, it is preferable to use a multi-stage electrolysis method in which a somewhat low current or low voltage is used during initial electrolysis, after which a somewhat high current or high voltage is used in the latter half of electrolysis. When this method is used, the bottoms of the micropores in the alumite film formed are broad and have a triangular shape, thereby being able to increase the precipitated amount of nickel or cobalt.

The thickness of alumite film 3 that is formed by this anodic oxidation treatment is 15 μm or more, preferably 15-100 μm, and more preferably 15-50 μm.

Continuing, the resulting alumite film 3 is washed. Since it is necessary to completely remove any residual electrolytic solution in the micropores of alumite film 3, alumite film 3 is washed thoroughly with clean, running water.

Continuing, electrolytic coloring treatment using nickel salt or cobalt salt is performed on this alumite film 3 to deposit nickel or cobalt in micropores 4 of alumite film 3 and obtain electrolytic colored film 2.

The electrolysis bath used here is an electrolysis bath consisting primarily of nickel sulfate or cobalt sulfate to which has been added boric acid, aluminum sulfate, magnesium sulfate, tartaric acid or organic acid such as malic acid. The pH of the electrolysis bath is set to be within the range of 4-6, and the temperature of the electrolysis bath is set to be within the range of 5-30° C.

Electrolysis is performed using an inert conductive material such as a carbon rod for the anode so that alumite film 3 serves as the cathode. An alternating current of 5-60 V, superimposed alternating and direct current or rectangular pulse current and so forth are used for the current, and the duration of electrolysis is about 1-50 minutes.

The electrolysis conditions here are naturally suitably selected according to the specifications and so forth of the desired electrolytic colored film 2.

Continuing, electrolytic colored film 2 formed in this manner is then subjected to sealing treatment as necessary. This sealing treatment is performed by a method in which the electrolytic colored film is immersed in deionized water and boiled for about 15 minutes in the boiling state.

In this manner, a far infrared radiator is obtained in which electrolytic colored film 2 is formed on the surface of base material 1.

In this type of far infrared radiator, fine particles of nickel or cobalt deposited in micropores 4 of electrolytic colored film 2 scatter light entering from the outside, resulting in electrolytic colored film 2 exhibiting a blackish-brown to black color.

In addition, as a result of fine irregularities being formed in the surface of electrolytic colored film 2, electrolytic colored film being thick, having a thickness of 15 μm or more, the structure of its micropores 4 being complex, and nickel or cobalt being heterogeneously and adequately deposited inside those micropores, the emissivity of the far infrared radiator is high, and superior heat resistance is obtained of 400° C. or higher.

Moreover, since ordinary aluminum or aluminum alloy and so forth is used for base material 1, there are no restrictions on the shape of base material 1, thereby allowing the obtaining of far infrared radiators of various shapes.

Figure 2:
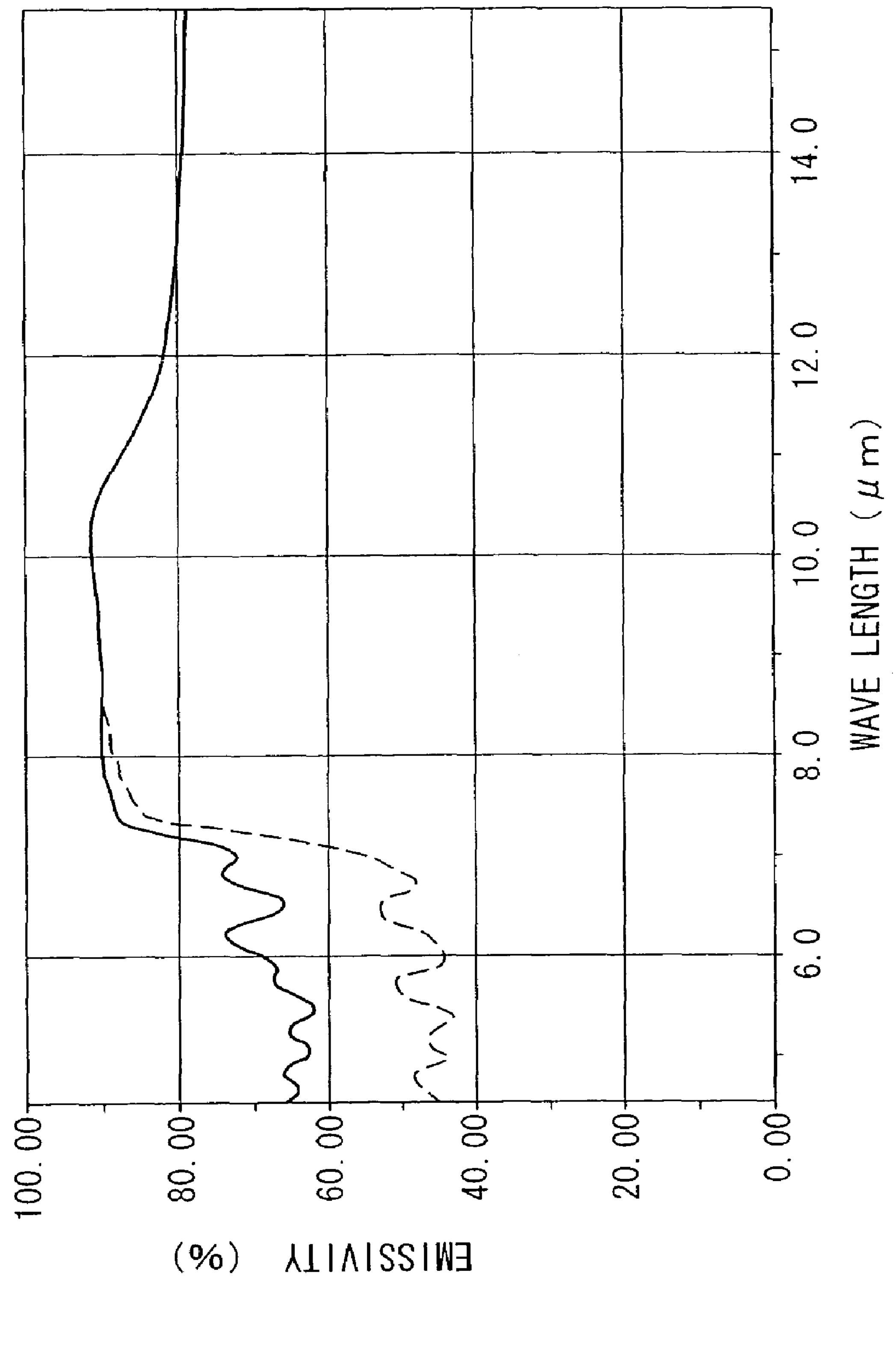
FIG. 2 is a graph showing the spectral emissivity of a far infrared radiator of the present invention and that of the prior art.

FIG. 2 is a graph showing the spectral emissivity at a wavelength of 4.5-15 μm and temperature of 200° C. of the far infrared radiator obtained by the production method of the present invention. The thickness of electrolytic colored film 2 of this far infrared radiator is 50 μm, and is heterogeneously deposited with nickel. As is clear from this graph, spectral emissivity at a wavelength of 7 μm or less is 60% or more.

As is indicated with the broken line in FIG. 2, in the case of a far infrared radiator impregnated with a metal such as iron, nickel or cobalt in the micropores of an alumite film of the prior art, spectral emissivity at a wavelength of 7 μm or less has an upper limit of 50%, and when considering that this value is normally 30-40%, the far infrared radiator of the present invention can be understood to be extremely superior. Moreover, integral emissivity of this far infrared radiator at a wavelength of 4.5-15 μm is 80%, which also demonstrates the superiority of its far infrared emission characteristics.

EXAMPLE 1

After degreasing an aluminum alloy plate (5005) having a thickness of 1.5 mm with acetone, the plate was sandblasted and washed with dilute hydrochloric acid to form fine irregularities having a 10-point mean roughness (Rz) of 10 μm. Next, the resulting plate was subjected to anodic oxidation treatment for 5-120 minutes at a current density of 1.6 A/dm$^2$ and temperature of 180° C. in an aqueous sulfuric acid solution having a concentration of 175 g/liter to form an alumite film having a thickness of 5-50 μm, after which this alumite film washed for 30 minutes in running water.

Continuing, this was then subjected to secondary electrolysis in an electrolysis bath at pH 4.5 containing 150 g/liter $NiSO_4.7H_2O$, 30 g/liter $H_3BO_3$, 7 g/liter $MgSO_4.7H_2O$ and 7 g/liter tartaric acid at a temperature of 20-22° C., direct current density of 0.3 A/dm$^2$, and using the alumite film for the cathode side and a carbon electrode for the anode, to form an electrolytic colored film and obtain a far infrared radiator.

At this time, the duration of electrolysis was set at 1, 5 or 10 minutes for alumite film for which anodic oxidation treatment lasted for 60 minutes, while the duration of electrolysis was set at 15, 20, 30 or 40 minutes for alumite film for which anodic oxidation treatment lasted for 90 minutes or 120 minutes.

EXAMPLE 2

With the exception of using an electrolysis bath at pH 5.5 containing 120 g/liter $CoSO_4.7H_2O$, 20 g/liter $H_3BO_3$ and 5 g/liter hydrazine sulfate for the electrolysis bath during secondary hydrolysis, an electrolytic colored film was formed in the same manner as Example 1 to obtain a far infrared radiator.

The far infrared radiators obtained in Examples 1 and 2 above were measured for (1) integral emissivity, (2) heat resistance temperature, (3) discoloration, (4) presence of heating crack formation, and (5) insulation resistance.

Measurement of (1) integral emissivity represents the results of measuring at a temperature of 200° C. and wavelength range of 4.5-15 μm.

Heat resistance temperature (2) represents the upper limit temperature at which discoloration and formation of heat cracks do not occur.

Discoloration (3) was judged to be present in the case of a Hunter color difference of 3.0 or more following heating for 100 hours at 400° C., or absent for a Hunter color difference of less than 3.0.

Heating cracks (4) were judged to be present if ten or more visible cracks formed on the surface of a sample measuring 1 cm×1 cm following heating for 100 hours at 400° C., or absent for less than 10 such cracks.

Insulation resistance (5) represents the value (MΩ) measured at a measuring voltage of 500 V with a direct current insulation meter following heating for 100 hours at 400° C.

The results for Example 1 are shown in Tables 1 and 2, while those for Example 2 are shown in Tables 3 and 4.

TABLE 1

| Secondary electrolysis time | | Film thickness (μm) 5 | 10 | 15 | 20 | 25 |
|---|---|---|---|---|---|---|
| 1 min. | Emissivity (%) | 46 | 50 | 53 | 60 | 65 |
| | Heat resist. temp. (° C.) | 350 | 350 | 350 | 350 | 400 |
| | Discoloration | Yes | Yes | Yes | Yes | Yes |
| | Heating cracks | Yes | Yes | Yes | Yes | Yes |
| | Insulation resist. (MΩ) | 5 | 15 | 40 | 70 | 100 |
| 5 min. | Emissivity (%) | 50 | 55 | 59 | 65 | 68 |
| | Heat resist. temp. (° C.) | 350 | 350 | 350 | 380 | 400 |
| | Discoloration | Yes | Yes | Yes | No | No |
| | Heating cracks | Yes | Yes | Yes | Yes | Yes |
| | Insulation resist. (MΩ) | 5 | 15 | 38 | 67 | 95 |
| 10 min. | Emissivity (%) | 53 | 60 | 75 | 75 | 75 |
| | Heat resist. temp. (° C.) | 350 | 350 | 400 | 400 | 420 |
| | Discoloration | Yes | Yes | Yes | No | No |
| | Heating cracks | Yes | Yes | Yes | No | No |
| | Insulation resist. (MΩ) | 5 | 15 | 35 | 63 | 90 |
| 15 min. | Emissivity (%) | 56 | 68 | 75 | 76 | 77 |
| | Heat resist. temp. (° C.) | 380 | 400 | 400 | 430 | 450 |
| | Discoloration | Yes | No | No | No | No |
| | Heating cracks | Yes | Yes | No | No | No |
| | Insulation resist. (MΩ) | 3 | 15 | 35 | 60 | 90 |
| 20 min. | Emissivity (%) | 60 | 70 | 78 | 78 | 79 |
| | Heat resist. temp. (° C.) | 380 | 400 | 450 | 450 | 480 |
| | Discoloration | No | No | No | No | No |
| | Heating cracks | Yes | No | No | No | No |
| | Insulation resist. (MΩ) | 3 | 15 | 35 | 60 | 85 |
| 30 min. | Emissivity (%) | 66 | 72 | 80 | 82 | 82 |
| | Heat resist. temp. (° C.) | 400 | 400 | 450 | 480 | 480 |
| | Discoloration | No | No | No | No | No |
| | Heating cracks | No | No | No | No | No |
| | Insulation resist. (MΩ) | 3 | 15 | 32 | 55 | 80 |
| 40 min. | Emissivity (%) | 68 | 73 | 84 | 84 | 85 |
| | Heat resist. temp. (° C.) | 400 | 400 | 450 | 500 | 500 |
| | Discoloration | No | No | No | No | No |
| | Heating cracks | No | No | No | No | No |
| | Insulation resist. (MΩ) | 3 | 12 | 30 | 55 | 80 |

TABLE 2

| Secondary electrolysis time | | Film thickness (μm) 30 | 35 | 40 | 45 | 50 |
|---|---|---|---|---|---|---|
| 1 min. | Emissivity (%) | 68 | 72 | 72 | 73 | 73 |
| | Heat resist. temp. (° C.) | 400 | 400 | 400 | 400 | 400 |
| | Discoloration | Yes | Yes | Yes | Yes | Yes |
| | Heating cracks | Yes | Yes | Yes | Yes | Yes |
| | Insulation resist. (MΩ) | 150 | 200 | 250 | 300 | 400 |
| 5 min. | Emissivity (%) | 70 | 73 | 73 | 74 | 74 |
| | Heat resist. temp. (° C.) | 400 | 400 | 400 | 400 | 400 |
| | Discoloration | No | No | No | No | No |
| | Heating cracks | Yes | Yes | Yes | Yes | Yes |
| | Insulation resist. (MΩ) | 135 | 180 | 225 | 275 | 360 |
| 10 min. | Emissivity (%) | 75 | 75 | 75 | 76 | 76 |
| | Heat resist. temp. (° C.) | 420 | 430 | 450 | 480 | 480 |
| | Discoloration | No | No | No | No | No |
| | Heating cracks | No | No | No | No | No |
| | Insulation resist. (MΩ) | 130 | 160 | 210 | 250 | 330 |
| 15 min. | Emissivity (%) | 77 | 78 | 80 | 80 | 80 |
| | Heat resist. temp. (° C.) | 480 | 500 | 500 | 500 | 500 |
| | Discoloration | No | No | No | No | No |
| | Heating cracks | No | No | No | No | No |
| | Insulation resist. (MΩ) | 120 | 150 | 200 | 230 | 310 |
| 20 min. | Emissivity (%) | 80 | 80 | 82 | 82 | 82 |
| | Heat resist. temp. (° C.) | 480 | 500 | 500 | 500 | 500 |
| | Discoloration | No | No | No | No | No |
| | Heating cracks | No | No | No | No | No |
| | Insulation resist. (MΩ) | 110 | 140 | 180 | 220 | 290 |
| 30 min. | Emissivity (%) | 83 | 83 | 83 | 84 | 85 |
| | Heat resist. temp. (° C.) | 500 | 500 | 500 | 500 | 500 |
| | Discoloration | No | No | No | No | No |
| | Heating cracks | No | No | No | No | No |
| | Insulation resist. (MΩ) | 110 | 135 | 170 | 200 | 260 |
| 40 min. | Emissivity (%) | 85 | 85 | 85 | 85 | 85 |
| | Heat resist. temp. (° C.) | 500 | 500 | 500 | 500 | 500 |
| | Discoloration | No | No | No | No | No |
| | Heating cracks | No | No | No | No | No |
| | Insulation resist. (MΩ) | 100 | 130 | 150 | 175 | 230 |

TABLE 3

| Secondary electrolysis time | | Film thickness (μm) 5 | 10 | 15 | 20 | 25 |
|---|---|---|---|---|---|---|
| 1 min. | Emissivity (%) | 48 | 51 | 55 | 61 | 67 |
| | Heat resist. temp. (° C.) | 350 | 350 | 350 | 350 | 400 |
| | Discoloration | Yes | Yes | Yes | Yes | Yes |
| | Heating cracks | Yes | Yes | Yes | Yes | Yes |
| | Insulation resist. (MΩ) | 6 | 17 | 41 | 72 | 110 |
| 5 min. | Emissivity (%) | 52 | 58 | 61 | 66 | 69 |
| | Heat resist. temp. (° C.) | 350 | 350 | 350 | 380 | 400 |
| | Discoloration | Yes | Yes | Yes | No | No |
| | Heating cracks | Yes | Yes | Yes | Yes | Yes |
| | Insulation resist. (MΩ) | 6 | 16 | 39 | 70 | 100 |
| 10 min. | Emissivity (%) | 55 | 62 | 76 | 75 | 76 |
| | Heat resist. temp. (° C.) | 350 | 350 | 400 | 400 | 450 |
| | Discoloration | Yes | Yes | No | No | No |
| | Heating cracks | Yes | Yes | Yes | No | No |
| | Insulation resist. (MΩ) | 6 | 15 | 37 | 65 | 95 |
| 15 min. | Emissivity (%) | 59 | 65 | 76 | 76 | 78 |
| | Heat resist. temp. (° C.) | 380 | 400 | 400 | 450 | 480 |
| | Discoloration | Yes | No | No | No | No |
| | Heating cracks | Yes | Yes | No | No | No |
| | Insulation resist. (MΩ) | 6 | 15 | 36 | 62 | 90 |
| 20 min. | Emissivity (%) | 61 | 72 | 78 | 80 | 80 |
| | Heat resist. temp. (° C.) | 380 | 400 | 450 | 450 | 500 |
| | Discoloration | No | No | No | No | No |
| | Heating cracks | Yes | No | No | No | No |
| | Insulation resist. (MΩ) | 6 | 13 | 35 | 60 | 85 |
| 30 min. | Emissivity (%) | 66 | 73 | 81 | 82 | 82 |
| | Heat resist. temp. (° C.) | 400 | 400 | 450 | 480 | 500 |
| | Discoloration | No | No | No | No | No |
| | Heating cracks | No | No | No | No | No |
| | Insulation resist. (MΩ) | 5 | 13 | 33 | 57 | 82 |

TABLE 3-continued

| Secondary electrolysis time | | Film thickness (μm) 5 | 10 | 15 | 20 | 25 |
|---|---|---|---|---|---|---|
| 40 min. | Emissivity (%) | 70 | 73 | 84 | 84 | 85 |
| | Heat resist. temp. (° C.) | 400 | 400 | 450 | 500 | 500 |
| | Discoloration | No | No | No | No | No |
| | Heating cracks | No | No | No | No | No |
| | Insulation resist. (MΩ) | 5 | 13 | 32 | 56 | 80 |

TABLE 4

| Secondary electrolysis time | | Film thickness (μm) 30 | 35 | 40 | 45 | 50 |
|---|---|---|---|---|---|---|
| 1 min. | Emissivity (%) | 69 | 73 | 73 | 74 | 74 |
| | Heat resist. temp. (° C.) | 400 | 400 | 400 | 400 | 400 |
| | Discoloration | Yes | Yes | Yes | Yes | Yes |
| | Heating cracks | Yes | Yes | Yes | Yes | Yes |
| | Insulation resist. (MΩ) | 160 | 210 | 270 | 320 | 430 |
| 5 min. | Emissivity (%) | 71 | 74 | 75 | 75 | 75 |
| | Heat resist. temp. (° C.) | 400 | 400 | 400 | 400 | 400 |
| | Discoloration | No | No | No | No | No |
| | Heating cracks | Yes | Yes | Yes | Yes | Yes |
| | Insulation resist. (MΩ) | 145 | 185 | 240 | 305 | 380 |
| 10 min. | Emissivity (%) | 78 | 77 | 77 | 77 | 77 |
| | Heat resist. temp. (° C.) | 450 | 450 | 450 | 480 | 480 |
| | Discoloration | No | No | No | No | No |
| | Heating cracks | No | No | No | No | No |
| | Insulation resist. (MΩ) | 135 | 170 | 220 | 280 | 340 |
| 15 min. | Emissivity (%) | 78 | 79 | 80 | 80 | 81 |
| | Heat resist. temp. (° C.) | 480 | 500 | 500 | 500 | 500 |
| | Discoloration | No | No | No | No | No |
| | Heating cracks | No | No | No | No | No |
| | Insulation resist. (MΩ) | 227 | 165 | 210 | 255 | 325 |
| 20 min. | Emissivity (%) | 80 | 81 | 82 | 83 | 85 |
| | Heat resist. temp. (° C.) | 500 | 500 | 500 | 500 | 500 |
| | Discoloration | No | No | No | No | No |
| | Heating cracks | No | No | No | No | No |
| | Insulation resist. (MΩ) | 115 | 155 | 195 | 240 | 310 |
| 30 min. | Emissivity (%) | 84 | 84 | 84 | 85 | 85 |
| | Heat resist. temp. (° C.) | 500 | 500 | 500 | 500 | 500 |
| | Discoloration | No | No | No | No | No |
| | Heating cracks | No | No | No | No | No |
| | Insulation resist. (MΩ) | 110 | 145 | 180 | 225 | 285 |
| 40 min. | Emissivity (%) | 85 | 85 | 85 | 85 | 85 |
| | Heat resist. temp. (° C.) | 500 | 500 | 500 | 500 | 500 |
| | Discoloration | No | No | No | No | No |
| | Heating cracks | No | No | No | No | No |
| | Insulation resist. (MΩ) | 105 | 140 | 165 | 205 | 255 |

COMPARATIVE EXAMPLE

An aluminum alloy plate (5005) having a 10-point mean roughness (Rz) of less than 1 μm was degreased with acetone followed by anodic oxidation treatment under the same conditions as Example 1 to form an alumite film having a thickness of 50 μm. Continuing, this was subjected to secondary electrolysis under the same conditions as Example 1 and setting the electrolysis time to 30 minutes to obtain a far infrared radiator.

The spectral emissivity at a wavelength of 4.5-7 μm and temperature of 200° C. of this far infrared radiator was 50-60%, which was lower than the values obtained in Examples 1 and 2. In addition, the integral emissivity at a wavelength of 4.5-14 μm was 72%, and the heat resistance temperature was 350° C.

INDUSTRIAL APPLICATION

The far infrared radiator of the present invention has superior emissivity particularly at a wavelength of 7 μm or less, enabling it to be suitably used in heating equipment for heating, heating equipment for cooking, heating equipment for industrial applications, heat radiators such as heat sinks and so forth.

What is claimed is:

1. A far infrared radiator comprising:

a base of a material composed of aluminum or aluminum alloy, an alumite film having micropores formed on the surface of said base material having a deposited thickness that is heterogeneous;

an electrolytic colored film comprising nickel or cobalt and having a thickness of 15 μm or more deposited on said alumite film from the bottom towards the top openings in said micropores of said alumite film; and fine irregularities in the interfacing surfaces of said base material and said alumite film, wherein the surface roughness of said electrolytic colored film is 1-20 μm in terms of 10-point mean roughness (Rz), the minimum value of the deposited thickness of nickel or cobalt is 2 μm, and the maximum value is 30 μm, said deposited nickel or cobalt is in metal form, and the integral emissivity of the radiator is in the wavelength range of 4-15 μm is 75% or more, and the heat resistance is 400° C. or higher.

2. A production method of a far infrared radiator comprising: forming fine irregularities in the surface of a base material composed of aluminum or aluminum alloy so that the 10-point mean roughness (Rz) is 1-30 μm, forming an alumite film by performing anodic oxidation treatment on this, and producing an electrolytic colored film by performing electrolysis in a nickel salt bath or cobalt salt electrolysis bath using this alumite film as the cathode.

3. The method according to claim 2 further comprising the step of sealing said electrolytic colored film.

4. The method according to claim 2 wherein said anodic oxidation treatment is performed by multi-stage electrolysis.

* * * * *

UNITED STATES PATENT AND TRADEMARK OFFICE
CERTIFICATE OF CORRECTION

PATENT NO. : 7,276,293 B1
APPLICATION NO. : 10/276413
DATED : October 2, 2007
INVENTOR(S) : Koichi Saruwatari et al.

It is certified that error appears in the above-identified patent and that said Letters Patent is hereby corrected as shown below:

On the title page:
In the Title Item [54]:

Please delete “Far-infrared Radiator and Method for Producing Method” and insert --Far-Infrared Radiator and its Production Method--

Signed and Sealed this

Twenty-seventh Day of November, 2007

JON W. DUDAS
*Director of the United States Patent and Trademark Office*

UNITED STATES PATENT AND TRADEMARK OFFICE

CERTIFICATE OF CORRECTION

PATENT NO. : 7,276,293 B1

APPLICATION NO. : 10/276413

DATED : October 2, 2007

INVENTOR(S) : Koichi Saruwatari et al.

It is certified that error appears in the above-identified patent and that said Letters Patent is hereby corrected as shown below:

In the Title Page:

Delete "Maejima Masatsugu" and insert -- Masatsugu Maejima --

Delete "Hirata Masanori" and insert -- Masanori Hirata --

Delete "Ito Hiroshi" and insert -- Hiroshi Ito --

Delete "Teramoto Keigo" and insert -- Keigo Teramoto --

Signed and Sealed this

Twenty-second Day of July, 2008

JON W. DUDAS

*Director of the United States Patent and Trademark Office*